US009718488B2

(12) United States Patent
Singh et al.

(10) Patent No.: US 9,718,488 B2
(45) Date of Patent: Aug. 1, 2017

(54) FOLDABLE CARRIAGE

(71) Applicant: Thule Canada Inc., Granby (CA)

(72) Inventors: Paramjit Singh, Calgary (CA); Wesley Justin Fleming, Calgary (CA); Miao Kaihua, Kunshan (CN)

(73) Assignee: Thule Canada Inc., Granby (CA)

(*) Notice: Subject to any disclaimer, the term of this patent is extended or adjusted under 35 U.S.C. 154(b) by 0 days.

(21) Appl. No.: 14/529,387

(22) Filed: Oct. 31, 2014

(65) Prior Publication Data

US 2015/0123381 A1     May 7, 2015

Related U.S. Application Data

(60) Provisional application No. 61/898,498, filed on Nov. 1, 2013.

(51) Int. Cl.
| | |
|---|---|
| B62B 9/12 | (2006.01) |
| B62B 7/06 | (2006.01) |
| B62B 3/02 | (2006.01) |
| F16C 11/10 | (2006.01) |

(52) U.S. Cl.
CPC ............. *B62B 3/02* (2013.01); *B62B 7/06* (2013.01); *B62B 7/068* (2013.01); *F16C 11/10* (2013.01); *F16C 2326/20* (2013.01)

(58) Field of Classification Search
CPC .... B62B 7/04; B62B 7/06; B62B 7/08; Y10T 403/3961; Y10T 403/3933; Y10T 403/37; Y10T 403/366; Y10T 403/32; Y10T 403/32098; Y10T 403/30; Y10T 403/24; Y10T 403/32418; Y10T 403/32409; Y10T 403/32401; Y10T 403/32368; Y10T 403/32361; Y10T 403/32336; Y10T 403/32327; Y10T 403/32319; Y10T 403/32262; Y10T 403/32254
See application file for complete search history.

(56) References Cited

U.S. PATENT DOCUMENTS

| | | | | |
|---|---|---|---|---|
| 1,144,471 A | * | 6/1915 | Gustafson | B64C 1/26 244/131 |
| 1,311,145 A | * | 7/1919 | Zeindler | F16L 37/252 285/27 |
| 2,982,379 A | * | 5/1961 | Fisher | E04H 12/185 182/115 |
| 3,000,466 A | * | 9/1961 | Johnson | E04G 1/34 182/118 |
| 3,221,837 A | * | 12/1965 | Fisher | E04G 1/34 182/115 |

(Continued)

FOREIGN PATENT DOCUMENTS

| | | |
|---|---|---|
| CN | 2730360 Y | 10/2005 |
| DE | 20218 521 U1 | 3/2003 |

*Primary Examiner* — J. Allen Shriver, II
*Assistant Examiner* — Travis Coolman
(74) *Attorney, Agent, or Firm* — Sterne, Kessler, Goldstein & Fox P.L.L.C.

(57) ABSTRACT

A carriage having a frame, where the frame is foldable between a use position and a storage position. The frame includes an attachment point for a plurality of frame components and a pivot lock for retaining the frame in the use position. The pivot lock is operated by rotating a portion of the frame of the carriage to unlock the pivot lock, permitting the carriage to be folded to the storage position.

19 Claims, 6 Drawing Sheets

(56) References Cited

U.S. PATENT DOCUMENTS

| | | | | |
|---|---|---|---|---|
| 3,239,873 A | * | 3/1966 | Fisher | B60B 33/021 16/35 R |
| 3,454,131 A | * | 7/1969 | Johnson | E04G 1/15 182/115 |
| 4,063,830 A | * | 12/1977 | Ban | E04H 15/60 135/114 |
| 4,657,113 A | * | 4/1987 | Costello | E04G 1/22 182/152 |
| 5,263,507 A | * | 11/1993 | Chuang | E04H 15/46 135/140 |
| 5,971,653 A | * | 10/1999 | Harpell | A01B 1/225 172/375 |
| 6,102,431 A | * | 8/2000 | Sutherland et al. | 280/642 |
| 6,116,624 A | * | 9/2000 | Hu | 280/47.371 |
| 6,827,365 B2 | * | 12/2004 | Yeh | 280/642 |
| 7,380,563 B2 | * | 6/2008 | Seo | E04H 15/32 135/114 |
| 7,401,803 B1 | * | 7/2008 | Lai | 280/647 |
| 7,712,765 B2 | * | 5/2010 | Chen et al. | 280/642 |
| 7,798,500 B2 | * | 9/2010 | Den Boer | 280/47.34 |
| 7,883,104 B2 | * | 2/2011 | Driessen | 280/650 |
| 7,922,182 B2 | * | 4/2011 | Van der Vegt | 280/47.36 |
| 8,061,732 B2 | * | 11/2011 | Song et al. | 280/650 |
| 8,128,119 B2 | * | 3/2012 | Saville et al. | 280/648 |
| 8,205,906 B2 | * | 6/2012 | Kretschmer et al. | 280/642 |
| 2005/0194755 A1 | * | 9/2005 | Lan | 280/47.38 |
| 2006/0061066 A1 | * | 3/2006 | Tan | 280/642 |
| 2006/0237949 A1 | * | 10/2006 | Hou et al. | 280/642 |
| 2006/0267303 A1 | * | 11/2006 | Golias | 280/47.34 |
| 2007/0013168 A1 | * | 1/2007 | Li | 280/642 |
| 2008/0088116 A1 | * | 4/2008 | Den Boer | 280/650 |
| 2008/0224450 A1 | * | 9/2008 | Van der Vegt | 280/642 |
| 2008/0224451 A1 | * | 9/2008 | Vegt | 280/642 |
| 2010/0025968 A1 | * | 2/2010 | Fritz et al. | 280/647 |
| 2010/0201103 A1 | * | 8/2010 | Kretschmer et al. | 280/642 |
| 2014/0064829 A1 | * | 3/2014 | Li et al. | 403/81 |

* cited by examiner

FOLDABLE CARRIAGE

FIELD

A carriage, such as a stroller, and a method for folding a carriage. The carriage has a foldable frame comprising a plurality of elongated frame components and a pivot lock and can be folded between a use position and a storage position. The pivot lock is adapted to retain the frame of the carriage in the use position.

BACKGROUND

Foldable carriages, such as foldable strollers, have been developed to permit a user to reduce the size of the carriage, permitting easy storage and transportation when the carriage is not in use. Usually a foldable carriage can be folded between a use position in which the carriage can be used for transporting an object, and a storage position, in which the carriage has a reduced size permitting the carriage to be stored in an easy manner.

To retain a foldable carriage in a use position, the foldable carriage has a pivot lock. The pivot lock retains the foldable carriage in the use position but as a precaution needs to be unlocked before the foldable carriage can be folded to the storage position.

The German utility model No. DE 20218 521 U1 disclose a pushchair having a pivot lock operated via a rotatable handle. The handle is arranged to two wires which run inside of the tubular frame of the pushchair. The wires are in turn connected to a lock flange which after being displaced permits the pushchair to be folded. It has shown however that wires are subjected to wear and run the risk of being damaged due to such wear. As the wires generally tend to run inside of the tubular frame it is difficult to discover such wear in advance. Another solution is disclosed in the Chinese patent disclosure, publication No. CN 2730360Y. The latter document discloses a stroller with a pivot lock comprises a rotatable handle which cooperates with two rods. The rods assist in locking the stroller in a use position. Both the above mentioned solutions require components that run inside of frame components, hence they are still rather complex solutions.

There is a need to provide simple yet sturdy solutions which are suitable on different kinds of carriages, preferably strollers.

SUMMARY

It is an object of the present invention to remove or reduce at least one of the drawbacks of the mentioned prior art, or to provide for a useful alternative. The object is at least partly met by a carriage comprising a frame. The frame is foldable between a use position and a storage position. An attachment point for a plurality of elongated frame components, a pivot lock arranged at said attachment point for locking the frame in the use position, a pivot axis about which the frame can be folded. The pivot lock is operable by rotating at least a portion of at least one of said elongated frame components, preferably by rotating one of the elongated frame components.

The present invention provides for a pivot lock for elongated components, and a carriage comprising a pivot lock for elongated frame components, which reduces the risk for a user acquiring injury due to pinching or crushing in the joint or between elongated frame components. It removes, or at least reduces, the need for additional mechanisms inside of the elongated frame components, which reduces weight, costs and complexity of the end product.

The frame can be provided with a first and a second attachment point for elongated frame components. The pivot axis can in such a case extend between the first and the second attachment points for elongated frame components. The frame can thus be configured so that the frame is folded at the first and the second attachment points. In this case the attachment points are joints.

According to an aspect, an elongated frame component connects said first and said second attachment points for elongated frame components. In this embodiment, the first and the second attachment points shares an elongated frame component which enables both the first and the second attachment points to be manipulated using the mentioned elongated frame component. Both the first and the second attachment point can thus be provided with a pivot lock, which assures that the frame can be retained in the use position. The elongated frame component is preferably a transverse elongated frame component. Transverse in the sense that is has a substantially perpendicular extension with respect to at least some of the other elongated frame components connected at the attachment point.

According to an aspect, the pivot lock is operable by rotating the transverse elongated frame component. The transverse elongated frame component can be operable to unlock the pivot lock so that the frame can be folded to the storage position. The transverse elongated frame component can be rotated about it longitudinal center line clock wise and/or counter clock wise. By using the transverse elongated frame component to unlock the pivot lock; one pivot lock can be operated or even two pivot locks can be operated simultaneously. Further, it provides for a rigid connection which is not depending on a mechanism arranged inside of the elongated frame component, as the elongated frame component itself is used to translate a rotational motion to a longitudinal motion with respect to the elongated frame component.

The carriage can comprise a first wheel side and the second wheel side. The first wheel side and the second wheel side are connected via the transverse elongated frame component. The transverse elongated frame component is thus substantially parallel, or parallel, with the wheel pivot axis of the frame. This permits the frame to be folded in a favourable position with respect to the wheel pivot axis.

According to an aspect, the carriage can comprise one or more pivot lock to lock the frame in a use position. The carriage can be provided with a first and a second pivot lock for example. Two pivot locks provides for a safe configuration. The first and the second pivot locks can be operable by an elongated frame component, preferably the transverse elongated frame component. This enables a simultaneous and rigid control of the pivot lock using relatively few components.

The pivot lock can be configured in different ways. The pivot lock can comprise a first and a second lock member, wherein the pivot lock comprises a first lock member and a translation member, the first lock member is adapted to engage and disengage an elongated frame component by a relative displacement of the first lock member. Specifically, if the first lock member is of a cogwheel type lock member, or if it is a cogwheel, the rotational motion of the transverse elongated frame component is translated via the translation member to displace the first lock member along a longitudinal center axis of the transverse elongated frame component.

The rotation of the at least a portion of at least one of the elongated frame components displaces the first lock member in direction along a longitudinal center axis of the transverse elongated frame component. The solution provides for a rigid configuration as a frame component is used to translate an imparted rotational motion by a user, to the displacement of the first lock member.

The transverse elongated frame component can be arranged in different ways to manipulate the first lock member. The transverse elongated frame component comprises a first and a second end, and the first end of the transverse elongated frame component can be cooperating with the first lock member. The cooperation can be directly or indirectly. A direct cooperation is a direct connection between the first end of the transverse elongated frame component and the first lock member. An indirect cooperation is an indirect connection with the first lock member e.g. via an intermediate member such a coupling member, translation member or similar.

According to an aspect, the transverse elongated frame component has a longitudinal center axis, and the displaceable lock member is displaced in a direction along the longitudinal center axis.

According to an aspect, the at least a portion of at least one of the elongated frame components can comprise a rotation lock. It is advantageous if the rotation of the elongated frame component is not actuated accidentally by a user. A rotation lock to the elongated frame component address this issue. The rotation lock is preferably arranged on the transverse elongated frame component, or at least associated with the transverse elongated frame component. The rotation lock is adapted to prevent the transverse elongated frame component from being accidentally rotated; hence the frame of the carriage can be configured with double lock mechanisms.

The rotation lock can comprise a handle, wherein the handle is operable to unlock the rotation lock and to rotate the transverse elongated frame component. This enables a user to unlock a two lock mechanisms using one grip and without changing grip between unlocking the first rotation lock and thereafter unlocking the pivot lock so that the frame can be folded to a storage position.

According to an aspect, the invention also relates to a method for folding a carriage to a storage position. The carriage comprises a frame which is foldable between a use position and a storage position, an attachment point for a plurality of elongated frame components. The frame further comprises a pivot lock arranged at the attachment point for locking the frame in the use position, and a pivot axis about which the frame can be folded. The method comprises the steps of unlocking the pivot lock by rotating a portion of at least one elongated frame component, so that the carriage is permitted to be folded to the storage position.

It is also within the boundaries of the present invention to provide a pivot lock for locking a first elongated component from pivoting with respect to a second elongated component about a pivot axis. The pivot lock is arranged in an attachment point for the first and the second elongated frame components and an additional third elongated component. The third elongated component has a longitudinal center axis. Wherein the pivot lock is operated by rotating the third elongated component about its longitudinal center axis and wherein the pivot axis and the longitudinal center axis are substantially parallel. The pivot lock is a sturdy lock with relatively few components.

The pivot axis and the longitudinal center axis are preferably aligned with each other.

According to an aspect, the third elongated component comprises an angled surface wherein by rotating the third elongated component about its longitudinal center axis, a lock member is displaced in a direction along the longitudinal center axis of the third elongated component. The lock member is disengaged from the first elongated component, permitting the first and the second elongated component to be pivoted with respect to each other.

According to an aspect, the invention relates to a carriage comprising a frame, the frame is foldable between a use position and a storage position. The frame comprises an attachment point for a plurality of frame components and a pivot lock for retaining the frame in the use position. The pivot lock is operated by rotating a portion of the frame of the carriage to unlock the pivot lock permitting the carriage to be folded to the storage position.

BRIEF DESCRIPTION OF THE DRAWINGS

Non-limiting embodiments of the present invention will be described with reference to the accompanying figures in which.

DETAILED DESCRIPTION

Figure 1:
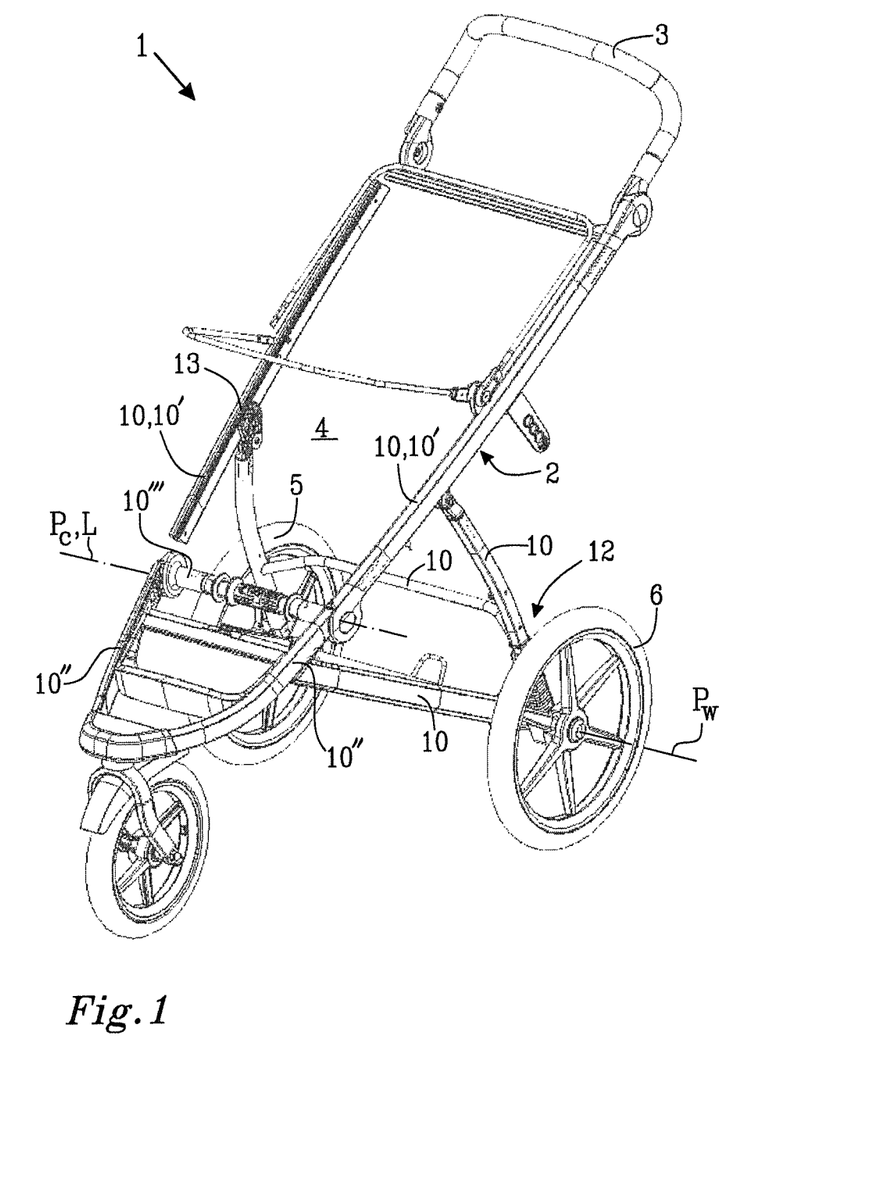
FIG. 1 shows the frame of a stroller arranged in a use position, the frame is foldable to a storage position.

FIG. 1 shows a carriage 1, in this case a stroller for a child. The carriage 1 comprises a frame 2, in this case a load carrying frame, a handle 3, and a child seat receiving site 4 adapted to receive an insert or a seat for a child. A first and a second rear wheel 5, 6 and a front wheel 7. The illustrated stroller is a tri wheel stroller, although the present invention is not limited to tri wheel strollers but can be applied on any carriage such as four wheel strollers. The carriage 1 is foldable, or collapsible. The carriage 1 can be folded between a use position, shown in FIG. 1, and a storage position. In the use position, the carriage 1 can be used to transport a child while in the storage position; the carriage 1 can easily be tucked away for storage or for transport in the trunk of a car for example.

The frame 2 is formed by a plurality of elongated frame components 10. The elongated frame components 10 are generally formed by extruded aluminum, but other materials are possible such as polymers, composites, wood, steel such as sheet steel, tubes formed by different materials, the like or combinations thereof. It is important however that the elongated frame components are selected so as to be able to safely carry the weight of load, especially in the cases of strollers.

As mentioned the carriage 1 is foldable. The carriage 1 comprises a pivot axis Pc about which the carriage 1 can be folded, or pivoted, between the use position and the storage position. The carriage 1 also comprises a pivot lock 20 to lock the carriage 1 in the use position. The carriage 1 further has a first wheel side 12 and a second wheel side 13 and a wheel pivot axis Pw extending there between. The wheel pivot axis Pw of course extends between a first and a second wheel. In the shown embodiment, the carriage 1 can be folded substantially parallel with the wheel pivot axis Pw.

Figure 2A:
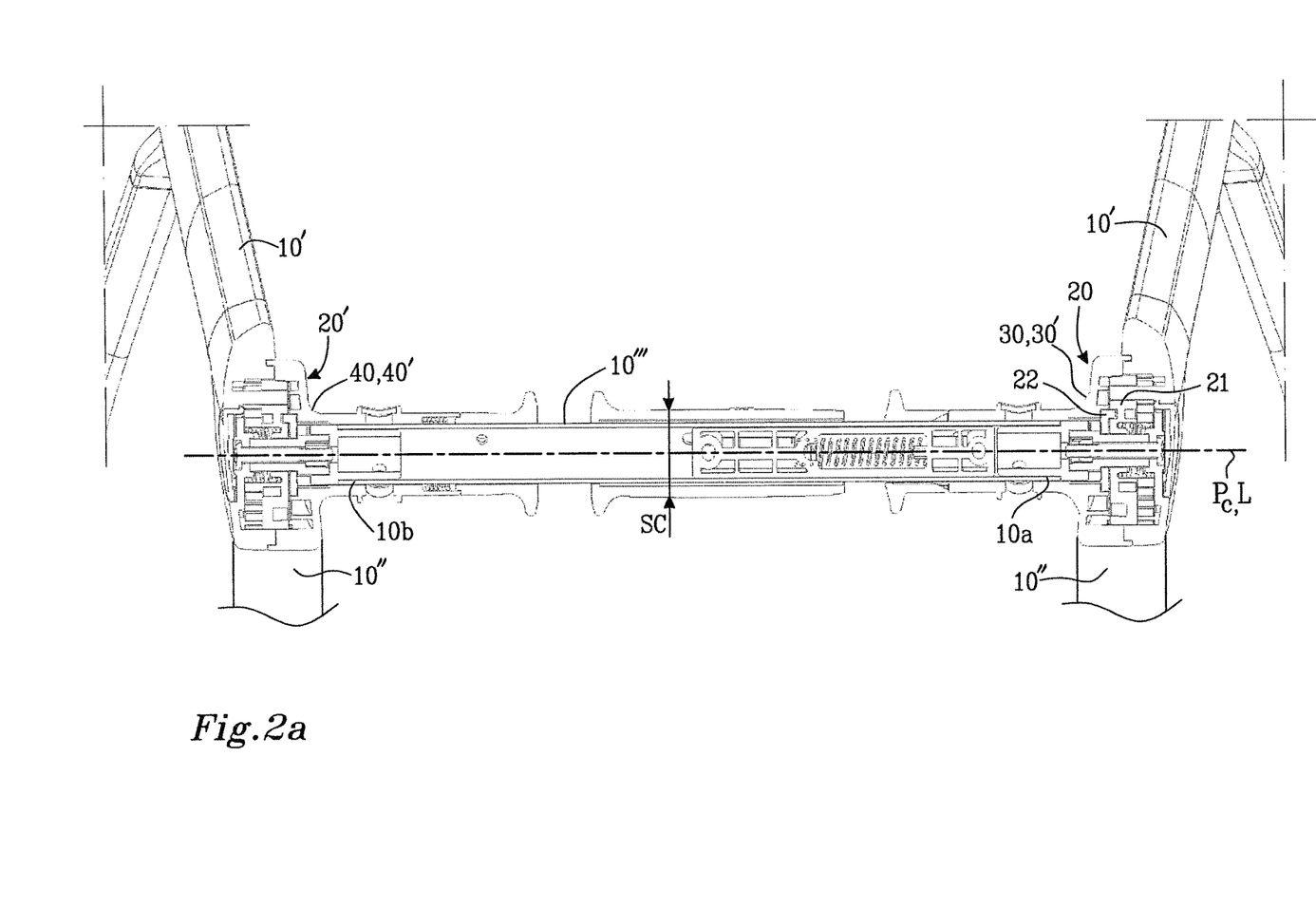
FIG. 2a shows a cross section of a portion of the frame shown in FIG. 1, illustrating a first and a second pivot lock, and portions of elongated frame members connected to a first and a second attachment point, the pivot locks being in a locked position.

FIG. 2a shows a cross section of a first and a second pivot lock 20, 20' which are in the shown embodiment substantially identical in function and structural features. Hereafter only one of the pivot locks 20, 20' will be described in greater detail. FIG. 2a further shows a transverse elongated frame component 10''' and a rotation lock which will be described in greater detail with reference to FIG. 2b. A carriage 1 can be provided with one or two, or more such pivot locks dependent on how the carriage is intended to be folded. The shown carriage 1, and the frame 2, can be folded once about the pivot axis Pc and can thus be provided with either one or two pivot locks 20.

The pivot lock 20 is operated using one of the elongated frame components 10 and more precisely by rotating at least one of the elongated frame components. The elongated frame component is rotated about its longitudinal center line L, and can be rotated a predetermined amount of angular degrees, preferably from 1-360°, more preferably from 10-270°, even more preferably from 20-180°, even more preferably from 20-90°.

As is noticeable, the carriage 1 comprises a first and a second attachment point 30, 40 for elongated frame components 10', 10'', 10'''. The pivot axis Pc intersects with the first and the second attachment point 30, 40 and a transverse elongated frame component 10''' extends between and connects the first and the second attachment points 30, 40. In the shown embodiment, each attachment point 30, 40 have three elongated frame components 10', 10'', 10''' attached thereto. As is noticed, the first and the second attachment points 30, 40 shares the transverse elongated frame component 10'''. Except for the transverse elongated frame component 10''', a first elongated frame component 10' and a second elongated frame component 10'' is attached to the attachment points 30, 40.

The pivot lock 20 is configured for locking a first elongated component, in this case an elongated frame component 10', from pivoting with respect to a second elongated component, in this case a second elongated frame component 10'', about a pivot axis Pc. The pivot lock is arranged in an attachment point 30, 40 for the mentioned first and the second elongated components and an additional third elongated component, in this case the transverse elongated component 10'''. The third elongated component has a longitudinal center axis L. The pivot lock is operated by rotating the third elongated component about its longitudinal center axis L, wherein the pivot axis Pc and the longitudinal center axis L are substantially parallel, and preferably aligned with each other.

The attachment points 30, 40 are joints 30', 40' at which the load carrying frame 2 can be folded. Each of the attachment points 30, 40 comprises a pivot lock 20 which is operated using the transverse elongated frame component 10'''. Any elongated frame component 10', 10'', 10''' connected to the attachment point could however be used to operate the pivot lock 20 dependent on the configuration of the pivot lock 20. An advantage of using a transverse elongated frame component extending between the first and the second attachment points 30, 40, is that the pivot locks 20, 20' can be simultaneously operated, e.g. unlocked.

The pivot lock 20 comprises a first lock member 21 which can be displaced via a translation member 22. The first lock member 21 engages both the first elongated frame component 10' and the second elongated frame component 10'' when being in a lock position. When the first lock member 21 is engaged, the first and the second elongated frame components 10', 10'' are prevented from being pivoted with respect to each other i.e. the frame 2 cannot be folded to a storage position. When the first lock member 21 is displaced from engagement using the translation member 22, the first and the second elongated frame components 10', 10'' are permitted to be pivoted with respect to each other i.e. the frame 2 can be folded to a storage position.

The transverse elongated frame component 10''' comprises a first and a second end 10a, 10b. Each end 10a, 10b is associated with a first lock member 21. The first lock member 21 is substantially disc shaped and can be displaced between a first and a second position. The first position is also referred to as the lock position. In the first position, the first lock member 21 fixates the first elongated frame component 10' with respect to the second elongated frame component 10'' by engaging both the first and the second elongated frame components 10', 10'' via the attachment point 30. The first attachment point 30 is effectively prevented from functioning as a joint, i.e. the first elongated frame component 10' cannot be pivoted with respect to the second elongated frame component 10''. When the first lock member 21 is in the second position (shown in FIG. 4), the first attachment point 30 is effectively functioning as a joint, i.e. the first elongated frame component 10' can be pivoted with respect to the second elongated frame component 10''.

The pivot lock 20 will be described in greater detail with reference to FIGS. 3 and 4.

Figure 2B:
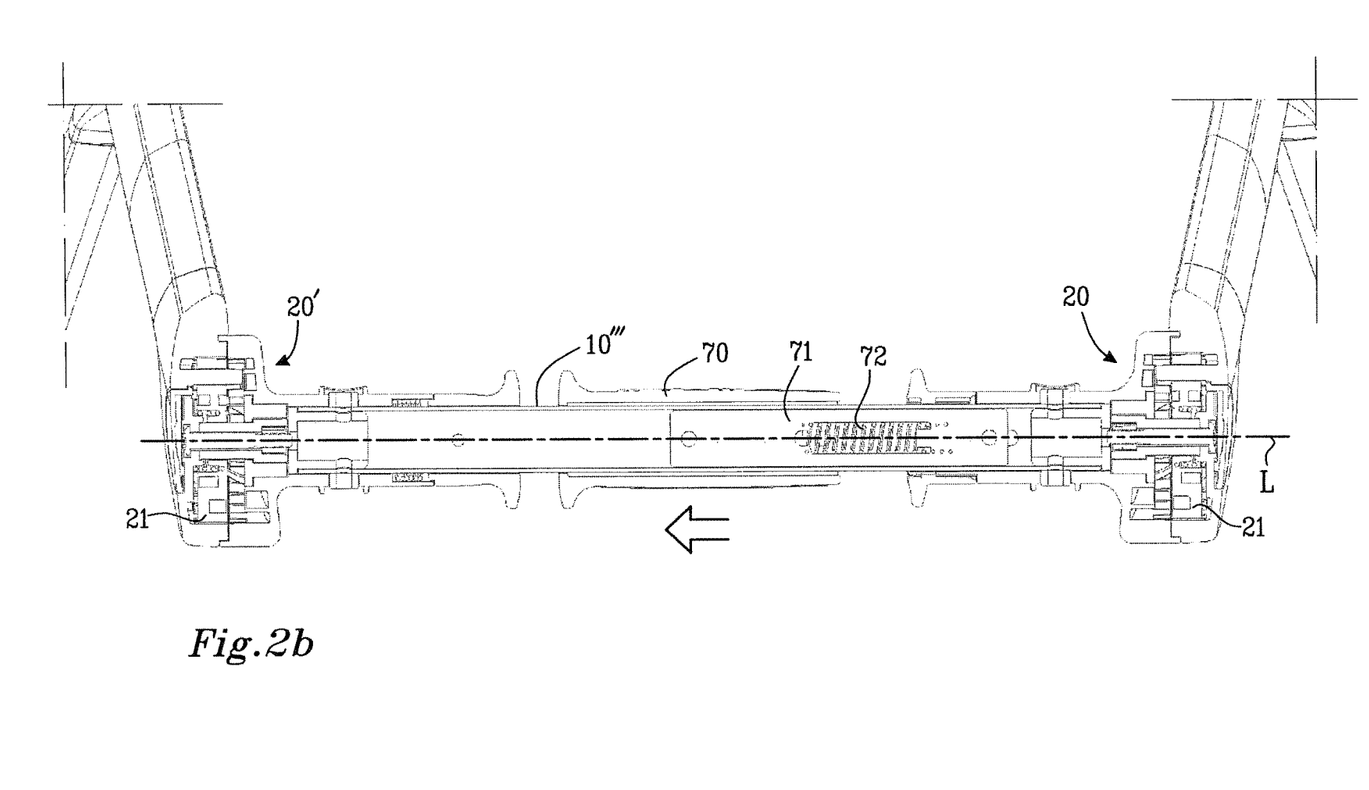
FIG. 2b shows a cross section of a portion of the frame shown in FIG. 1, illustrating a first and a second pivot lock, and portions of elongated frame members connected to a first and a second attachment point, the pivot locks being in an unlocked position.

FIG. 2b shows the cross section of FIG. 2a but with the pivot locks 20, 20' in an unlocked position, i.e. the lock member 21 displaced to the second position, i.e. the unlocked position. FIG. 2b further shows the rotation lock comprising a handle 70 and a lock mechanism 71. The handle 70 is biased using a spring 72 from left to right. When a user counter act the spring 72 and pushes the handle 70 from right to left as indicated by the arrow in FIG. 2b, a pin is displaced permitting the transverse elongated frame component 10''' to be rotated about its longitudinal center line L. Due to the configuration of the handle 70, the transverse elongated frame component 10''' can be rotated about its longitudinal center line L using the handle 70. Hence the carriage 1 can be folded using a two step lock mechanism in which a user first unlocks a rotational lock by a sliding motion of the handle 70, and then using the same handle, and with no need to change grip, the user unlocks the pivot lock by rotating the handle 70 and thus rotates the transverse elongated frame component 10'''.

Figure 3:
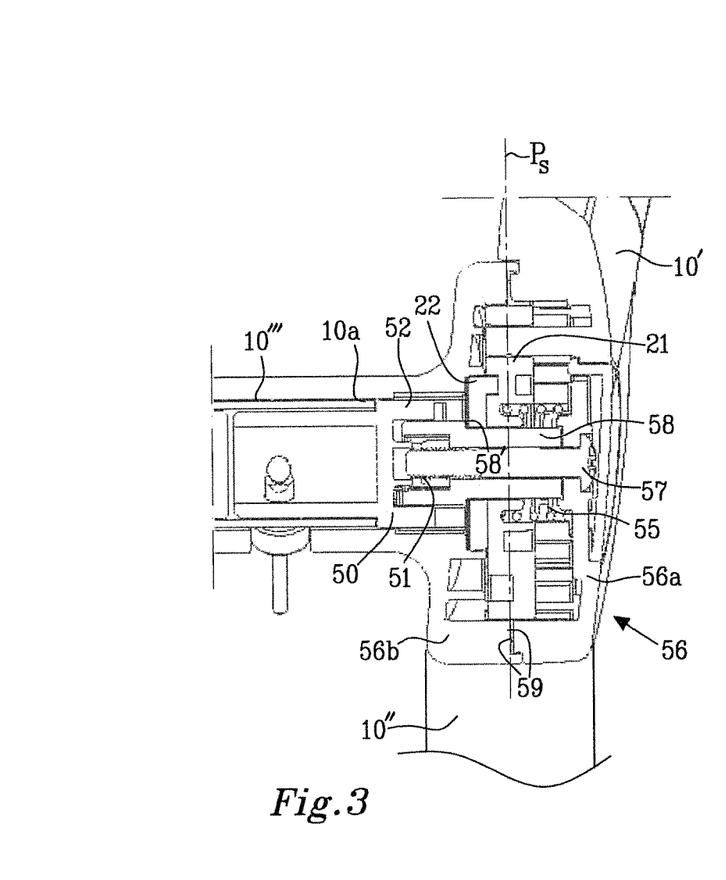
FIG. 3 shows the cross section of the first pivot lock at the first attachment point in greater detail, the pivot lock, and the first lock member, is in a locked position, in which the carriage is prevented from being folded.

FIG. 3 shows the first lock member 21 in the first position, i.e. a locked position. In FIG. 3, the first end 10a of the transverse elongated frame component 10''' is arranged to a coupling member 50 having a central bore 51 and a rim 52 arranged around the bore 51. The rim is engaged with the second lock member so that if the transverse elongated frame component 10''' is rotated about its longitudinal axis P, the coupling member 50 and the translation member 22 rotates synchronously with it. The first lock member 21 is biased towards the translation member 22 using a biasing member, in the shown embodiment in the form of a helical spring 55. The spring 55 braces against an interior surface of a housing 56 of the attachment point 30. A screw 57 extends through the housing 56 and connects the second lock member 21 via a sleeve 58 about which the translation member 22 can rotate. The sleeve 58 further provides a shelf 58' against which the translation member 22 can rest.

As can be noticed in FIG. 3, the housing 56 is formed by a first portion 56a of the attachment point 30 and a second portion 56b of the attachment point 30, which each portions are connected to an elongated frame component. A slip surface 59 is arranged on both the first and second portions 56a, 56b of the attachment point 30, and can be said to divide the housing 56 in two halves. The slip surfaces 59 of the housing 56 are flat and configured so that the first and the second portions 56a, 56b of the housing 56 can slip against each other during folding of the frame 2 between the use position and the storage position. The first elongated frame component 10' is attached to first portion 56a of the attachment point 30, and the second elongated frame component 10" is attached to the second portion 5b of the attachment point 30. The slip surfaces 59 of each portion 56a, 56b of the housing 56 together define a plane Ps which is substantially perpendicular with respect to the pivot axis Pc of the frame 2 and the longitudinal center line L of the transverse elongated frame component 10'''.

As can be seen, the first lock member 21 is intersecting the slip surfaces 59 of the housing 56 and the plane Ps when the first lock member is in the first position. The first lock member 21 is a cogwheel (shown in greater detail in FIG. 5). The teeth of the first lock member 21 engages the interior surface of the housing 56 and in the lock position as shown in FIG. 3, the first lock member 21 engages both the first portion 56a of the housing 56 and the second portion 56b housing 56. The first lock member 21 extends across the slip surfaces 59 of the housing and thus prevents the first elongated frame component 10' and the second elongated frame component 10" from pivoting with respect to each other. As mentioned above, the first lock member 21 is a cogwheel having teeth which interacts with the interior surface of the housing 56. The interior surface of the housing 56 has corresponding grooves, adapted to engage with the teeth of the first lock member 21. It should be noted that the interior surface of the housing 56 can be provided with teeth and the first lock member 21 with grooves instead.

Instead of using a cogwheel, the first lock member 21 can have substantially any polygonal form providing locking surfaces. For example, the first lock member could be pentagonal, hexagonal, heptagonal or the like.

Figure 4:
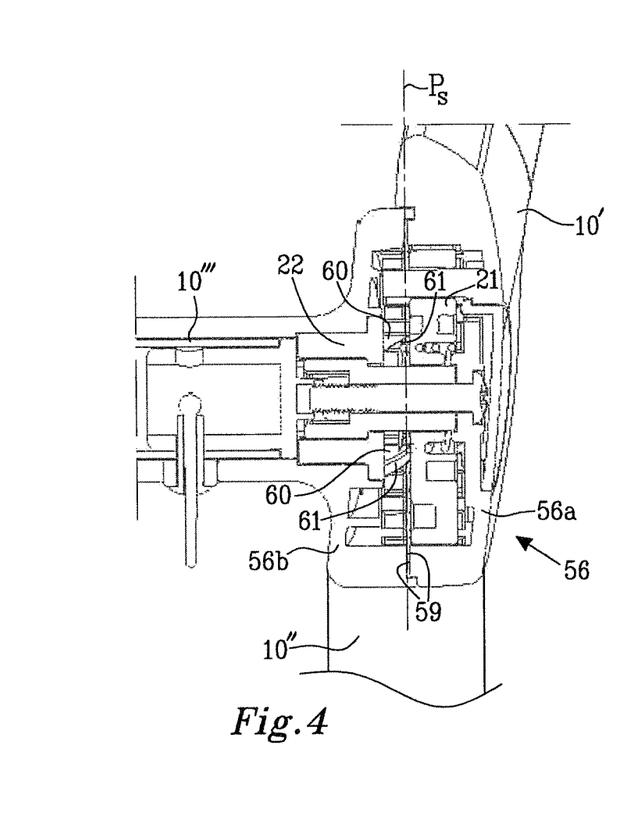
FIG. 4 shows the cross section of the first pivot lock at the first attachment point in greater detail, the pivot lock, and the first lock member, is in un unlocked position, in which the carriage can be folded.

FIG. 4 shows the pivot lock of FIG. 3 with the first lock member 21 in the second position, i.e. an unlocked position. As can be seen in FIG. 4, the translation member 22 comprises tooth shaped protrusions 60 which engage the first lock member 21. The tooth shaped protrusions 60 extend in a direction corresponding to the longitudinal center line L of the transverse elongated frame component 10'''. Each protrusion 60 comprises an angled surface 61, forming the tooth shaped protrusions 60.

When the translation member 22 is rotated, as a consequence of the rotation of the transverse frame component 10''', the angled surfaces 61 of the protrusion 60 slips on a surfaces of the first lock member 21, preferably formed by grooves, and push the first lock member 21 in a direction away from the translation member 22 and the first end 10a of the transverse elongated frame component 10'''. At one point, the protrusions 60 of the translation member 22 has pushed the first lock member 21 past the plane Ps formed by the slip surfaces 59 of the housing 56, so that the first lock member 21 disengages from the first portion 56a of the housing 56 and its corresponding grooves, permitting the first frame component 10' to be pivoted with respect to the second frame component 10". It should be noted that in an embodiment, the transverse elongated frame component 10''' can be provided with angled surfaces just as the protrusions 60 of the translation member 22, i.e. the translation member 22 can be integrally formed with the transverse elongated frame component 10'''.

In FIG. 4, the slip surfaces 59 of the housing 56 is arranged to the left of the first lock member 21, i.e. the first lock member 21 is displaced from the slip surfaces 59 and the plane Ps which they define. The first lock member 21 is thus disengaged from the second elongated frame component 10" permitting the first elongated frame component 10' and the second elongated frame component 10" to pivot with respect to each other.

Each elongated frame component 10', 10", 10''' is formed by a hollow tubular component formed by extruded aluminum, while the attachment point 30, 40, and the housing 56, in this case the joints 30', 40' are formed by a plastic material such as polypropylene.

Figure 5:
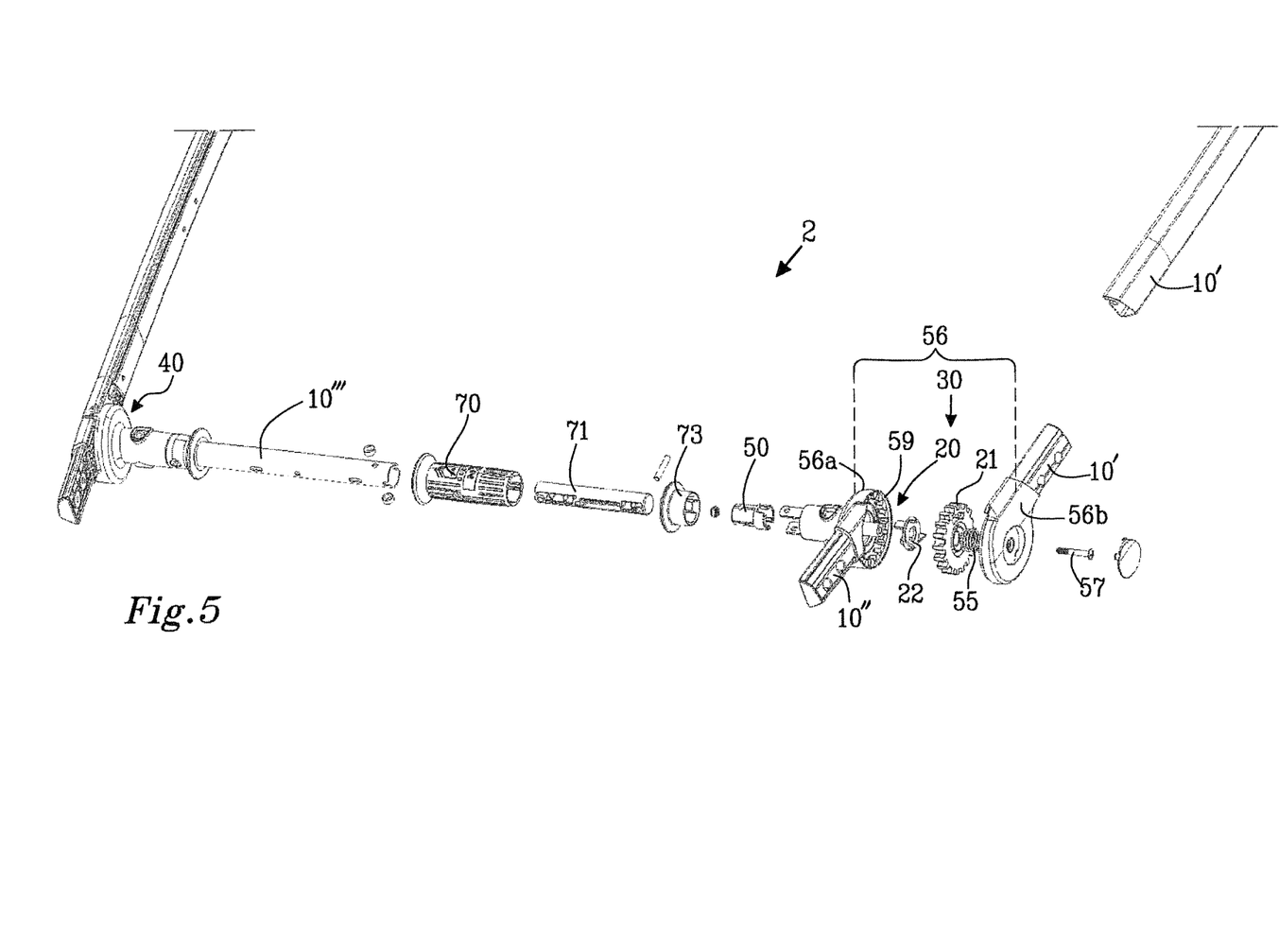
FIG. 5 shows an exploded view of a portion of the frame with the first attachment point.

FIG. 5 shows an exploded view of a portion of the frame 2 comprising the first attachment point 30. FIG. 5 shows from left to right; the second attachment point 40, the transverse elongated frame component 10''', the slidable handle 70 and the lock mechanism 71 providing a rotation lock for the transverse elongated frame component 10''', a protective sleeve 73 comprising a gripping surface, the coupling member 50, a first portion 56a of the housing 56 comprising the slip surface 59, the translation member 22, the first lock member 21, the spring 55, the second portion 56b of the housing 56, and the screw 57 connecting the first portion 56a of the housing 56 with the second portion 56b of the housing 56 and indirectly the transverse elongated frame component 10'''. In the inside of the first portion 56a of the housing 56 can grooves be seen which cooperates with the teeth of the first lock member 21. Similar grooves are arranged on the inside of the second portion 56b of the housing 56.

Figure 6:
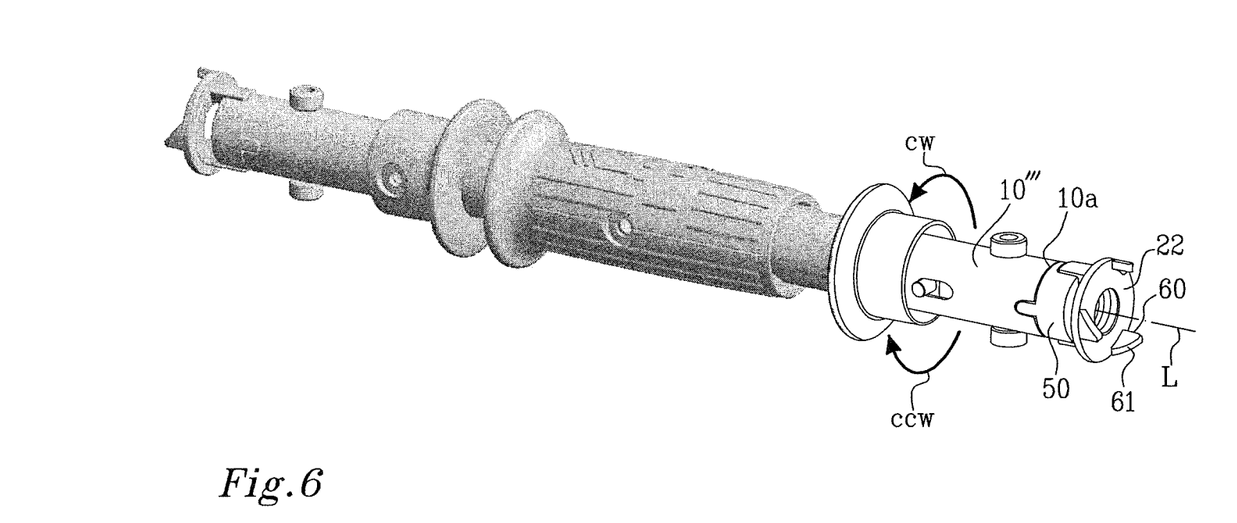
FIG. 6 shows the first end of the transverse elongated frame component without the first and the second elongated frame components attached thereto.

FIG. 6 shows the first end 10a of the transverse elongated frame component 10''' in greater detail without the first and the second elongated frame components 10', 10" attached thereto. FIG. 6 specifically show the translation member 22 and the protrusions 60 with their angled surfaces 61, adapted to interact with grooves arranged in the first lock member 21. It should be noted that the transverse elongated frame component 10''' can be rotated counter clock wise or clock wise dependent on which side the angled surfaces 61 is arranged on the protrusions 60. If the protrusions 60 comprises angled surfaces 61 on two sides, it may be possible that the transverse elongated frame component 10''' can be rotated about its longitudinal center line L in both a clock wise and in a counter clock wise direction, as indicated with the arrows CW (clock wise) and CCW (counter clock wise). The important feature is that the rotational motion of the transverse elongated frame component 10''' can be translated to a motion in a direction along the longitudinal center line L of the transverse elongated frame component 10''' so that the first lock member 21 can be displaced.

It is possible that instead of rotating an elongated frame component 10', 10", 10''' as described above, only a portion of the elongated frame component is rotated. For example, the elongated frame component 10''' can be formed by a first and a second elongated frame component which are rotatably connected together using e.g. a swivel connection between the first and the second ends 10a, 10b. The position of such swivel connection is illustrated in FIG. 2 with the reference SC.

According to a second aspect, the present invention also relates to a method for folding a carriage, such as a stroller, to a storage position. The carriage comprises a frame foldable between a use position and a storage position. An attachment point for a plurality of elongated frame components, a pivot lock arranged at the attachment point for locking the frame in the use position, a pivot axis about which the frame can be folded. The method comprises the steps of;—unlocking the pivot lock by rotating at least a portion of at least one elongated frame component, so that the carriage is permitted to be folded to the storage position.

The invention claimed is:

1. A carriage, comprising:
    a frame, said frame being foldable between a use position and a storage position;
    a first attachment point for a plurality of elongated frame components;
    a second attachment point for a plurality of elongated frame components;
    a first pivot lock arranged at said first attachment point configured to lock said frame in said use position; and
    a pivot axis about which said frame can be folded,
    wherein said pivot lock is configured to operate by translating a portion of a transverse elongated frame component having a longitudinal center axis in a direction parallel to said longitudinal center axis and rotating said portion of said transverse elongated frame component in a direction about said longitudinal center axis,
    wherein said portion of said transverse elongated frame component is disposed entirely between said first attachment point and said second attachment point.

2. The carriage according to claim 1, wherein said pivot lock comprises a first lock member and a translation member, wherein said first lock member is configured to engage and disengage a first elongated frame component by a relative displacement of said first lock member.

3. The carriage according to claim 2, wherein said rotation of said portion of said transverse elongated frame component displaces said first lock member in a direction parallel to said longitudinal center axis of said transverse elongated frame component.

4. The carriage according to claim 3, wherein said transverse elongated frame component comprises a first and a second end, and wherein said first end of said transverse elongated frame component is configured to displace said first lock member.

5. The carriage according to claim 2, wherein said translation member comprises a plurality of protrusions configured to engage said first lock member.

6. The carriage according to claim 1, wherein said pivot axis extends between said first and said second attachment points.

7. The carriage according to claim 6, wherein said transverse elongated frame component connects said first and said second attachment points.

8. The carriage according to claim 6, wherein said frame is folded at said first and said second attachment points.

9. The carriage according to claim 1, wherein said transverse elongated frame component comprises a rotation lock configured to prevent rotation of said transverse elongated frame component when said rotation lock is in a locked position.

10. The carriage according to claim 9, wherein said rotation lock comprises a handle, said handle being said portion of said transverse elongated frame component configured to unlock said rotation lock and to rotate said transverse elongated frame component.

11. The carriage according to claim 7, wherein said frame comprises a first wheel side and a second wheel side, wherein said first wheel side and said second wheel side are connected via said transverse elongated frame component.

12. The carriage according to claim 1, wherein said carriage further comprises a second pivot lock, wherein said first and said second pivot locks are configured to operate by translating said portion of said transverse elongated frame component in a direction parallel to said longitudinal center axis and rotating said portion of said transverse elongated frame component in a direction about said longitudinal center axis.

13. A carriage, comprising:
    a frame, wherein said frame is configured to fold between a use position and a storage position;
    a first attachment point configured to attach a plurality of elongated frame components and a second attachment point configured to attach a plurality of elongated frame components, wherein said frame is configured to fold at said first and said second attachment points;
    a pivot lock arranged at said first attachment point and configured to lock said frame in said use position;
    a pivot axis extending between said first and said second attachment points, wherein said frame is configured to fold about said pivot axis; and
    a transverse elongated frame component connecting said first and said second attachment points,
    wherein said pivot lock is configured to be operated by rotating said transverse elongated frame component, and
    wherein said transverse elongated frame component comprises a rotation lock having an actuation member configured to unlock the rotation lock, wherein said actuation member is disposed entirely between said first attachment point and said second attachment point.

14. The carriage according to claim 13, wherein said actuation member is configured to translate in a direction parallel to said pivot axis.

15. The carriage according to claim 14, wherein said actuation member is configured to translate toward said first attachment point.

16. The carriage according to claim 13, wherein said actuation member comprises a handle disposed about said pivot axis.

17. A method for folding a carriage to a storage position, said carriage having a frame foldable between a use position and a storage position, a first attachment point for a plurality of elongated frame components, a second attachment point for a plurality of elongated frame components, a pivot lock arranged at said first attachment point configured to lock said frame in said use position, and a pivot axis about which said frame can be folded, said method comprising the steps of:
    unlocking said pivot lock by translating a portion of a first elongated frame component disposed entirely between said first attachment point and said second attachment point toward said first attachment point in a direction parallel to its longitudinal center axis, and, after said translating, rotating said portion of said first elongated frame component in a direction about said longitudinal center axis, wherein said carriage is permitted to be folded to said storage position upon said translating and said rotating of said portion of said first elongated frame component.

18. The method according to claim 17, wherein said portion of said first elongated frame component comprises a handle configured to translate in a direction parallel to said longitudinal center axis of said first elongated frame component and configured to rotate in a direction about said longitudinal center axis of said first elongated frame component.

19. The method according to claim 17, wherein translating said portion of said first elongated frame component unlocks a rotation lock configured to prevent rotation of said first elongated frame component when said rotation lock is in a locked position.

\* \* \* \* \*